though the overall balance of forces urges the cylinder barrel, in toto, toward the bearing plate, the low pressure side tends to lift off the plate bearing surface due to the build-up of leakage fluid between the plate and the cylinder barrel on the low pressure side.

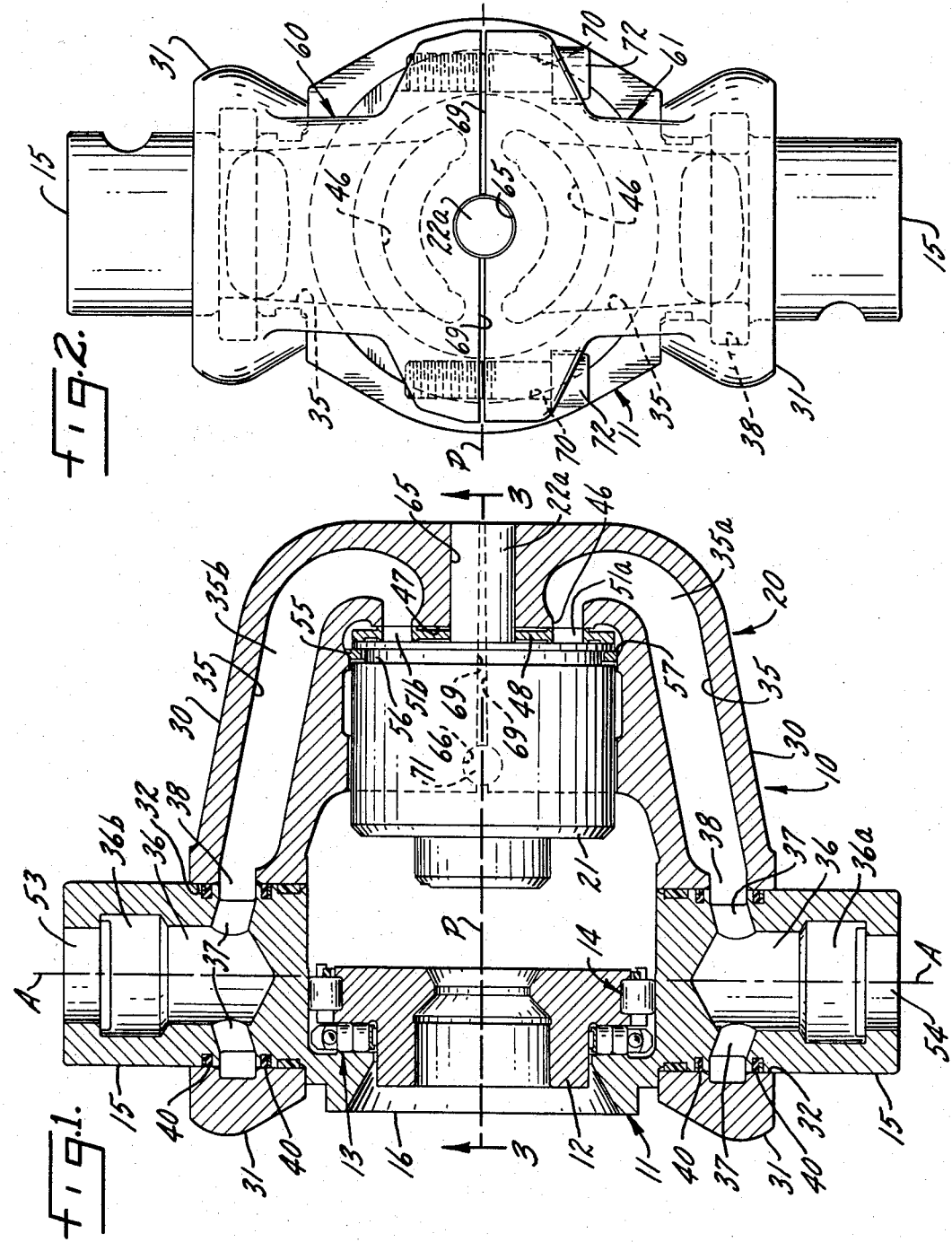

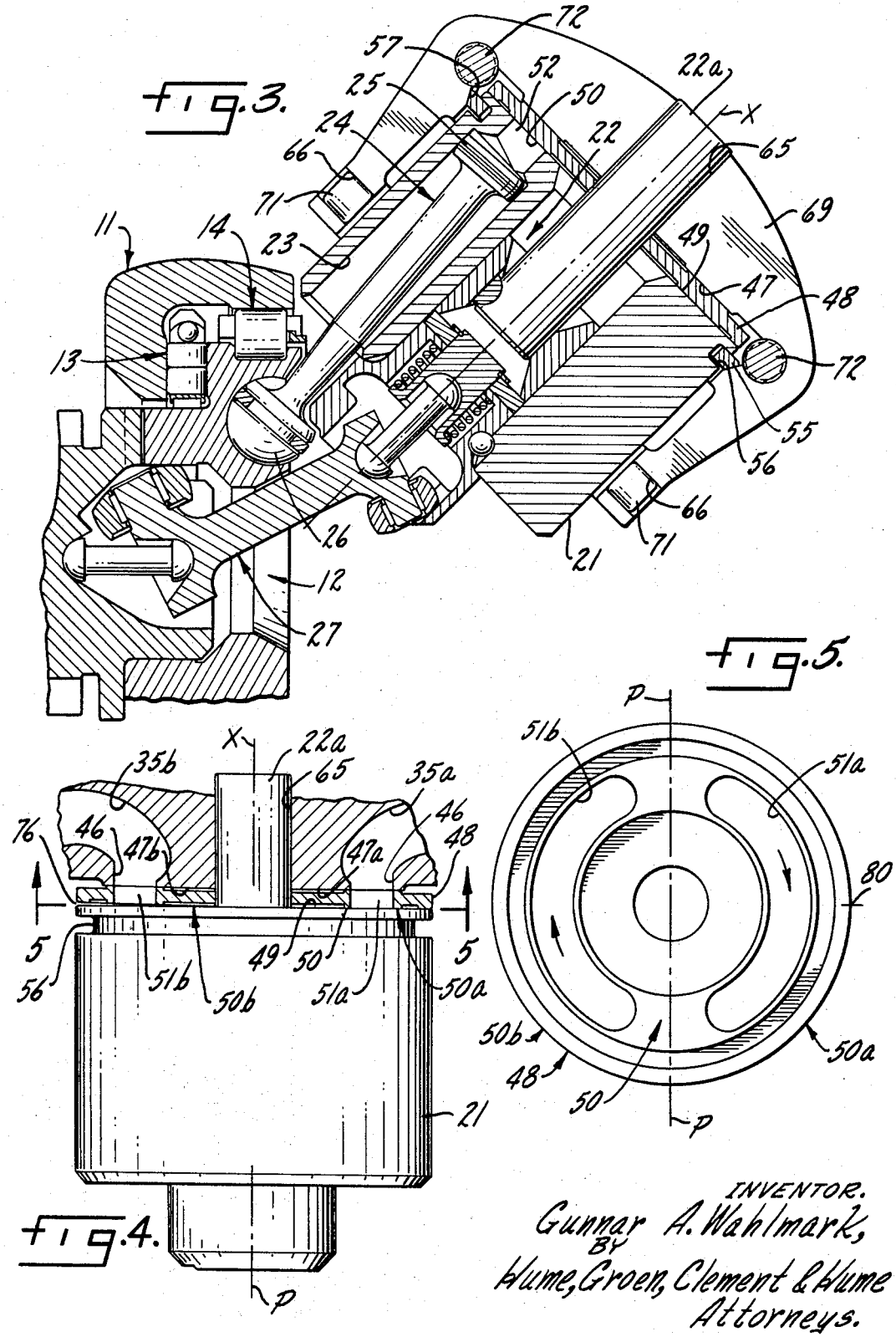

United States Patent Office 3,371,616
Patented Mar. 5, 1968

3,371,616
FLUID DEVICE
Gunnar A. Wahlmark, 211 S. Rockford Ave.,
Rockford, Ill. 61108
Filed June 18, 1965, Ser. No. 465,120
7 Claims. (Cl. 103—162)

ABSTRACT OF THE DISCLOSURE

A swash plate type fluid device in which the cylinder barrel rotates in bearing relationship against a bearing surface on a port plate. The bearing surface includes two 180 degree sections disposed at a slight angle to each other, and a barrel rotates in parallel, bearing relationship against only one of these sections on its pressure side to assure a uniform bearing relationship. The angularly related surface sections are achieved by splitting the trunnion-cylinder head of the device on the axis of rotation of the barrel and reassembling the two split sections about three positioning pins, one of which permits the head segments to incline slightly toward each other, causing the plate support surface to comprise two 180 degree canted sections and the tightly fastened plate to bend and acquire the same angular configuration.

---

This invention relates in general to swash plate fluid devices. It deals more particularly with swash plate fluid devices of the "trunnion" type.

In a trunnion swash plate fluid device, the cylinder barrel is conventionally mounted in the head of a yoke for rotation about an axis against a bearing surface. The yoke is, in turn, journaled on trunnions for angular movement relative to a swash mechanism operatively connected in a well-konwn manner to the cylinder barrel by a plurality of pistons.

The yoke is conventionally formed with a planar bearing surface (or a planar surface for supporting a bearing plate carrying a planar bearing surface); the intent being, of course, to assure uniform bearing surface contact around the 360° cylinder barrel bearing surface. In practice, however, this is not the result. The 180 degree "high" pressure side of the barrel tends to be urged toward the bearing plate because of the axial pressure force developed therein, but the 180 degree "low" pressure side of the barrel has no such tendency. Even though the overall balance of forces urges the cylinder barrel, in toto, toward the bearing plate, the low pressure side tends to lift off the plate bearing surface due to the build-up of leakage fluid between the plate and the cylinder barrel on the low pressure side.

The normal result is that the cylinder barrel tilts slightly off the plate bearing surface and bears only on the remotest periphery of the bearing surface on the high pressure side of the barrel as fluid builds up a wedging effect between the opposed bearing surfaces. Excessive wear of the bearing surfaces is effected at this remote peripheral point on the high pressure side of the cylinder barrel. Fluid leakage from between the bearing surfaces also becomes excessive.

It is an object of the present invention to provide an improved trunnion swash plate fluid device.

It is another object to provide a new and improved yoke construction for mounting the cylinder barrel in a trunnion type swash plate fluid device.

It is still another object to provide a yoke construction which assures a uniform bearing surface relationship between the rotating cylinder barrel surface and the bearing surface on the yoke or a bearing plate.

It is still another object to provide a yoke construction which improves the mounting of a cylinder barrel mounting pin.

It is a further object to provide a new and improved method of constructing a cylinder barrel mounting yoke for a trunnion type swash plate fluid device.

The foregoing and other objects are realized in accord with the present invention by providing a cylinder barrel mounting yoke which is fabricated substantially in one piece with three pin receiving bores formed in the yoke, one of said bores being the barrel mounting pin receptacle while the other two lie in the same plane and extend transversely of the mounting pin bore. The yoke is then split into two segments along the contemplated plane of arcuate movement of the yoke, which passes through the axis of rotation of the cylinder barrel and is perpendicular to the common plane of the three bores.

The opposed faces of the segments are then machined down a predetermined extent and the segments are reassembled on two positioning pins and the cylinder barrel mounting pin. The positioning pins are precisely the diameter of their corresopnding bores while the mounting pin is intentionally made slightly smaller in diameter than its receiving bore. Accordingly, when the mounting pin is clamped between the bore section in the opposing yoke segments, the segments are pivoted slightly out of precise parallel alignment about the mounting pins so that they converge slightly in the direction of the mountnig pin. As a result, the bearing plate mounting surface within the yoke is actually composed of two substantially 180 degree sections disposed at a very slight angle relative to each other.

With opposite 180 degree sections of the bearing plate mounting surface canted relative to each other about the plane of arcuate movement of the yoke, the relatively thin bearing plane secured to the mounting surface is correspondingly bent. The cylinder barrel then rotates in uniform bearing relationship against that 180 degree bearing surface section of the plate which underlies the high pressure side of the cylinder barrel while any fluid which tends to build up between the cylinder barrel bearing surface and the plate bearing surface on the low pressure side of the cylinder barrel readily escapes from the wedge shaped gap between the barrel and the plate and does not tend to tilt the cylinder barrel up on one edge.

When the high and low pressure sides of the barrel are reversed, as when the direction of operation of the fluid device is reversed, the cylinder barrel tilts from parallel, uniform bearing relationship with the one 180 degree bearing surface section on the bearing plate onto parallel, uniform bearing relationship with the opposite 180 degree bearing surface section. Uniform bearing surface relationship thus is maintained over approximately 180 degrees of the cooperating bearing surfaces regardless of the direction of operation of the fluid device, whether it be a pump or motor.

The invention, both as to its organization and method of operation, taken with further objects and advantages thereof, is illustrated more or less diagrammatically in the accompanying drawings, in which:

FIGURE 1 is a plan view of a trunnion swash plate fluid device manufactured in accord with the present invention, with parts shown in section and other parts removed;

FIGURE 2 is an end elevational view of the swash plate fluid device of FIGURE 1, illustrating primarily the yoke construction embodying features of the present invention;

FIGURE 3 is a sectional view taken along line 3—3 of FIGURE 1;

FIGURE 4 is an enlarged fragmentary view of the yoke construction and cylinder barrel mounting arrangement in the trunnion type swash plate type fluid device illustrated in FIGURE 1; and FIGURE 5 is a view taken along line 5—5 of FIGURE 4.

Referring now to the drawings, and particularly to FIGURES 1–3, a trunnion type swash plate fluid device embodying features of the present invention is illustrated generally at 10. The trunnion fluid device 10 illustrated is a variable displacement fluid pump including a trunnion body 11 which mounts a swash mechanism 12 thereon in a conventional thrust bearing assembly 13 and radial bearing assembly 14. The trunnion body 11 has a pair of trunnions 15 formed unitary therewith and extending in opposite directions from the center section 16 of the body.

The trunnions 15 pivotally mount a yoke assembly 20, constructed in accord with the present invention, for pivotal movement in a center line plane P about the axis A. The yoke assembly 20, in turn, mounts a cylinder barrel 21 in bearing relationship on a bearing pin mounting assembly 22 for rotation about the axis X defined by mounting pin 22a. The cylinder barrel 21 has a plurality of cylinders 23 formed therein, nine in the present instance, in spaced relationship round its axis X of rotation.

Pistons 24 having their piston heads 25 slidable in corresponding cylinders 23 are operatively connected to the swash mechanism 12 by the ball joint connectors 26. A three roller constant speed joint assembly 27 interconnects the cylinder barrel 21 and the swash mechanism 12 to maintain constant speed synchronized rotation of the barrel and the swash mechanism during operation of the fluid device 10. Since the ball joint connectors 26 and the constant speed joint 27 form no specific part of the present invention, however, along with the swash mechanism 12, they are not described further in detail.

The yoke assembly 20 includes a pair of yoke arms 30 pivotally mounted on corresponding trunnions 15. To this end, the free end 31 of each yoke arm 30 has a transversely extending circular cylindrical passage 32 formed in it. The diameter of the passage 32 is substantially equal to the diameter of the corresponding circular cylindrical trunnion 15 so that the arms 30 fit snugly over the corresponding trunnions in the manner illustrated, for pivotal movement about the axis.

Each arm 30 is formed with a fluid passage 35 extending through it and these fluid passages are in communication with a passage 36 in a corresponding trunnion 15 through a pair of branch passages 37 in each trunnion and an annular port 38 in each arm 30. Annular fluid tight seals 40 encircle each trunnion 15 in bracketing relationship with corresponding branch passages 37 and, accordingly, the annular ports 38 in the yoke arms 30.

Each passage 35 extends through a trunnion arm 30 into the head 45 of the yoke 15 and terminates in a generally kidney shaped port 46 extending through the bearing plate support surface 47 within the head. A bearing plate 48 generally circular in configuration is conventionally tightly mounted against the support surface 47, and the cylinder barrel 21 is rotatably mounted in bearing relationship on its bearing surface 49 against the continuous bearing surface 50 of the annularly unitary bearing plate 48. Generally kidney shaped ports 51 conforming in shape and position to the kidney shaped ports 46 in the yoke head 45 are formed through the bearing plate 48 and communicate sequentially in a well-known manner with the cylinder ports 52 in the bearing surface 49 of the cylinder barrel 21.

During normal operation of the variable displacement fluid pump 10, the cylinder barrel 21 rotates in a clockwise direction on the plate 48, as illustrated by arrows in FIGURE 5. As such, with a positive displacement angle of the yoke assembly 20 and cylinder barrel 21 relative to the swash mechanism 12 (as illustrated in FIGURE 2) charging fluid enters the trunnion passage 35b through the inlet 53, passes through the yoke arm passage 35b, and sequentially enters the cylinders 23 of the rotating cylinder barrel 21 through the kidney shaped charging port 51b in the port plate 48. Simultaneously, fluid is sequentially discharged under pressure from the cylinders 23 through the discharge port 51a in the plate 48, the yoke arm passage 35a, and the trunnion passage 36a to the outlet 54.

It will thus be seen that the semi-cylindrical segment of the cylinder barrel 21 which, at any one time, overlies the 180 degree section 50a of the plate bearing surface 50 on the right side of the plane P, as illustrated in FIGURES 4 and 5, is the output or high pressure side of the pump 10. Conversely, that semi-cylindrical segment of the cylinder barrel 21 which, at any one time, overlies the 180 degree section 50b of the plate bearing surface 50 on the left side of the plane P is the charging or low pressure side.

On the high pressure side of the cylinder barrel 21 a substantial amount of axial force, exerted by the pressure developed in the cylinders 23, tends to urge the cylinder barrel bearing surface 49 tightly against the bearing plate bearing surface 50. Though there is little effective force in the low pressure side cylinders 23 tending to urge the cylinder barrel 21 toward the bearing plate 48, the overall effect of the axially directed forces within the cylinders 23 is to urge the whole cylinder barrel toward the plate. In this light, a pressure balance relationship whereby the forces effective on the barrel 21 are overbalanced slightly toward the plate 48 is preferably established in a well known manner by relieving the bearing surface 49 of the cylinder barrel to provide bearing lands of predetermined surface area.

To prevent separation of the cylinder barrel 21 from the plate 48 when the device 10 is not operating, or during starting, for example, a split locking ring 55 is provided in an annular recess 56 in the cylinder barrel 21. The ring 55 is seated against an annular inclined abutment 57 provided within the yoke head 45 and tends to urge the cylinder barrel 21 lightly toward the port plate 48 in the manner described in the co-pending application of Gunnar A. Wahlmark, Ser. No. 380,785, filed July 7, 1964, now Patent No. 3,320,003 and entitled "Fluid Device."

According to the present invention, the bearing yoke 20 comprises two identical segments 60 and 61, each segment containing one-half of the yoke head 45 and a leg 30, as will be recognized. The yoke 20 is initially cast in one piece, however. While still in one piece, a bore 65 for the mounting pin 22a is machined through the head 45 of the yoke 20. In addition, axially aligned positioning bores 66 are machined through the head 45, in the plane P. In the alternative, of course, the bores 65 and 66 might be formed when the yoke 20 is cast.

After forming the bores 65 and 66, and also a pair of threaded bolt holes 70 extending transversely across the plane P in bracketing relationship with the bore 65, the yoke 20 is split along the plane P. The opposed planar faces 69 of the yoke segments 60 and 61 are then machined down anywhere from 0.05–0.10 inch. The two segments 60 and 61 of the yoke 15 are subsequently drawn tightly together on positioning pins 71 and the mounting pin 22 seated in the sectioned bores 66 and 65, respectively, with bolts 72 threaded into corresponding bolt holes 70.

The positioning pins 71 have precisely the same diameter as their receiving bores 66. Accordingly, the two half sections 47a and 47b of the bearing plate supporting surface 47 are drawn substantially into alignment along the axis X. However, a mounting pin 22a purposely 0.001 inch smaller in diameter than the bore 65 is clamped in the sectioned bore. As a result, the two yoke segments 60 and 61 are canted slightly toward each other in the direction of the pin 22 about the axis of the positioning pins 71 and, similarly, the mounting surface sections 47a and 47b are also canted slightly relatively to each other. Accordingly, as seen in FIGURE 4, the annularly unitary bearing plate 48 secured tightly against the surfaces 47a and 47b is flexed slightly along a line in the plane P and the bearing surface 50 is, in turn, divided into relatively canted 180 degree half-sections 50a and 50b.

Because the bearing surface sections 50a and 50b lie in planes slightly angularly displaced relative to each other, the cylinder barrel 21 rotates in uniform bearing relationship only against the 180 degree section 50a of the bearing surface 50 on the bearing plate 48. This is the so-called "high" pressure side of the cylinder barrel 21 during operation of the pump 10 in the manner described.

In contrast to the uniform bearing relationship of the bearing surface 49 on the high pressure side of the cylinder barrel 21 against the bearing surface section 50a, a wedge shaped gap 76 is defined between the cylinder barrel bearing surface and the 180 degree bearing surface section 50b on the port plate 48. Due to the presence of this slight wedge-shaped gap 76, leakage fluid from the charging port 51b in the plate 48 between the bearing surfaces 49 and 50b readily escapes from between the surfaces and does not tend to build up between the surfaces to tilt the entire cylinder barrel 21 up on its remotest periphery point 80 on the high pressure side of the cylinder 21. As a result, the excessive wear normally encountered on bearing surfaces at this point in conventional trunnion fluid devices is avoided.

If the high and low pressure sides of the cylinder barrel 21 are reversed by changing the angular relationship between the pivotally mounted yoke 20 and the swash mechanism 12, in a well known manner, the cylinder barrel 21 merely tilts on the slightly V-shaped plate bearing surface 50 so as to come into uniform bearing relationship with the 180 degree bearing surface section 50b. This tilting is accommodated by the mounting pin bearing assembly 22 on which the cylinder barrel 21 rotates. Obviously the wedge shaped gap 76 then appears between the cylinder barrel bearing surface 49 and the bearing plate surface section 50a. The result in operation is the same, however a uniform 180 degree bearing surface relationship between the cylinder barrel 21 and the port plate 48 is established without tilting the cylinder barrel 21 up on one edge.

It will now be recognized that an improved trunnion type fluid device 10 has been described which is simple in construction and assures optimum bearing surface relationship between a rotating cylinder barrel and a bearing surface upon which it is seated. Because a minimum 180 degree flat bearing surface relationship is assured, the pressure balance relationship between forces urging the cylinder barrel 21 toward the plate 48 and those tending to separate the plate and the barrel can be reduced until only the very slightest unbalance in the direction of the plate 48 is developed. Accordingly, friction is reduced to a very low factor with concomitant reduction in wear of the device.

The fluid device 10 has been described in the context of a variable displacement fluid pump. It should be recognized, however, that the principles of the present invention are readily applicable to a fixed displacement pump or to a variable or fixed displacement motor.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. In a fluid device including a cylinder barrel having a thrust bearing face seated against a cylinder head for rotation about an axis extending generally perpendicular from said head, the improvement comprising: annularly unitary valve plate means between said head and said cylinder barrel, said valve plate means including a bearing surface means providing substantially all of the thrust bearing support of said barrel by said head as said barrel rotates on said head, said bearing surface including first and second surface sections disposed at an angle to each other about a line passing through said axis, one of said surface sections supporting said barrel bearing face in parallel, uniform bearing relationship on the pressure side of the rotating barrel during operation of the fluid device, said second bearing surface being canted at an angle to said bearing face so as to define a wedge shaped space between said second bearing surface and said bearing face.

2. The improvement in fluid device in claim 1 further characterized in that said plate is bent slightly about said line to form said first and second surface sections, each of said surface sections defining a 180 degree semi-circle around said axis.

3. The improvement in fluid device of claim 1 further characterized in that said cylinder barrel is mounted for tilting movement on said bearing surface about said line separating said bearing surface sections, whereby when the direction of operation of the fluid device is reversed, said barrel tilts onto said second surface section in parallel, uniform bearing relationship as the pressure side of the rotating barrel changes.

4. A trunnion fluid device, comprising: a trunnion yoke including cylinder head means, bearing surface means on said head means, a cylinder barrel rotatably mounted for rotation against said bearing surface means on said cylinder head means about an axis defined by an axis pin extending from said head means, said head means being split into two head sections substantially along a plane in which said axis lies, said two head sections being joined together in such a manner that said bearing surface means includes at least two bearing surface sections disposed at an angle to each other about a line passing through said axis, one of said bearing surface sections supporting said barrel bearing face in parallel, uniform bearing relationship on the pressure side of the rotating barrel during operation of the fluid device.

5. The trunnion fluid device of claim 4 further characterized in that said head sections are joined together about said axis pin and a pair of positioning pins lying transversely of said axis substantially in said plane, the relationship of said pins to said head sections being such that the head sections are inclined lightly toward each other in a direction from said positioning pins toward said axis pin.

6. The trunnion fluid device of claim 5 further characterized in that said positioning pins lie in straight alignment with each other substantially in said plane.

7. The trunnion fluid device of claim 6 further characterized by and including a valve plate means having said bearing surface means thereon, said valve plate means being slightly bent to define said two bearing surface sections disposed at an angle to each other.

References Cited

UNITED STATES PATENTS

| | | | |
|---|---|---|---|
| 2,298,850 | 10/1942 | Vickers | 103—162 |
| 2,313,407 | 3/1943 | Vickers et al. | 103—162 |
| 2,853,025 | 9/1958 | Van Meter | 103—162 |
| 2,977,891 | 4/1961 | Bishop | 103—162 |
| 3,089,427 | 5/1963 | Firth et al. | 103—162 |
| 3,124,079 | 3/1964 | Boyer | 103—162 |

DONLEY J. STOCKING, *Primary Examiner.*

W. L. FREEH, *Assistant Examiner.*

UNITED STATES PATENT OFFICE
CERTIFICATE OF CORRECTION

Patent No. 3,371,616                                           March 5, 1968

Gunnar A. Wahlmark

It is certified that error appears in the above identified patent and that said Letters Patent are hereby corrected as shown below:

Column 6, line 56, the claim reference numeral "6" should read -- 4 --.

Signed and sealed this 31st day of March 1970.

(SEAL)
Attest:

Edward M. Fletcher, Jr.                          WILLIAM E. SCHUYLER, JR.
Attesting Officer                                            Commissioner of Patents